United States Patent [19]
Griesemer

[11] Patent Number: 5,908,205
[45] Date of Patent: Jun. 1, 1999

[54] POSITION ADJUSTMENT DEVICE FOR VEHICLE SAFETY BELTS

[75] Inventor: Albert Griesemer, Dorfwiese 3 56457, Westerburg, Germany

[73] Assignee: Albert Griesemer, Westerburg, Germany

[21] Appl. No.: 09/014,675

[22] Filed: Jan. 28, 1998

[30] Foreign Application Priority Data

Jan. 30, 1997 [DE] Germany ................ 297 01 481 U

[51] Int. Cl.⁶ ................................ B60R 22/20
[52] U.S. Cl. ........................ 280/801.2; 280/808
[58] Field of Search ............. 280/801.2, 801.1, 280/808; 297/483, 486

[56] References Cited

U.S. PATENT DOCUMENTS 4,572,544  2/1986  Cunningham et al. ......... 280/801.2
5,205,588  4/1993  Yamaoka et al. .............. 280/801.2

FOREIGN PATENT DOCUMENTS

126578   11/1994  European Pat. Off. ......... 280/801.2
2657819   6/1978  Germany ........................... 297/483

*Primary Examiner*—Eric D. Culbreth
*Attorney, Agent, or Firm*—Pillsbury Madison & Sutro LLP

[57] ABSTRACT

A position adjustment device for a direction reversing guide for vehicle safety belts includes a guide rail, a displacement element with an arresting mechanism, advancing member, replacement member and possibly displacement levers. This height-adjustment device is suitable for high stresses and at the same time can be simply and inexpensively produced. The guide rail (1) essentially has a C-shaped cross section, the adjustment element (12, 12') is guided along end strips (3) of the guide rail (1), and a detent element (19), which is taken along by the adjustment element (12, 12') extends through recesses (6, 18) in the guide rail (1) and the displacement element (12, 12'). A metal spring (21, 32), which forces the detent element (19) into the recesses (6, 18), is provided for maintaining the arrested position at the adjustment element (12, 12'), and a position restoring spring for the position adjustment device is also provided.

12 Claims, 5 Drawing Sheets

POSITION ADJUSTMENT DEVICE FOR VEHICLE SAFETY BELTS

FIELD OF THE INVENTION

The invention relates to a position or height-adjustment device for a direction reversing guide (D-ring) for vehicle safety belts.

BACKGROUND OF THE INVENTION

Devices for use with vehicle safety belts that are adjustable to different positions, to accommodate differences such as height, are known in many designs. It is a sign of the times that increasingly higher mechanical and other demands are made on them. On the one hand, they should add to safety even under extreme accident conditions, on the other hand, for reasons of competition, the capital outlay and, in particular, the production costs, should be as low as possible.

The principal demand for stability and dependability is met primarily by the selection of the material and the material strength. However, this sometimes results in a heavy construction, which is less desirable for other reasons. It has always been a goal to reduce device size by improving the material. But this is only possible to a certain degree, and the comparatively high production costs connected with this are felt to be problematical here.

This is where the invention has specific applicability.

OBJECT AND SUMMARY OF THE INVENTION

It is the object of the invention to further develop a position adjustment device of the type mentioned at the outset in such a way that, on the one hand, it is suitable for high stresses and, on the other hand, can be produced simply and cost effectively.

This object is attained by the provision of a guide rail having in-turned flanges and an adjustment element movable on the guide rail to permit selective positioning of the end of a seat belt or similar anchoring device. Practical further developments are recited below.

Conventional materials can be used in connection with the invention. High dependability is achieved in spite of this and is based, on the one hand, on the solidity of the guide rail because of its special shape, and on the other hand, on the extensive arresting mechanism between the adjustment element and the guide rail. In this case, the adjustment element and the locking element cooperating with it, inclusive of a locking element metal spring, can have a quite simple basic shape.

Ease of manipulation can be increased with the help of simple actuating levers. The elements in accordance with the invention can also be employed for the further simplification of other functions, in particular for advancing and restoring the position of the adjustment device. By means of this, the object, which is the basis of the invention, is attained on a broad front, so to speak.

The invention will be described in more detail below for preferred embodiments, making reference to the drawings.

DETAILED DESCRIPTION OF THE PREFERRED EMBODIMENTS

Figure 1:
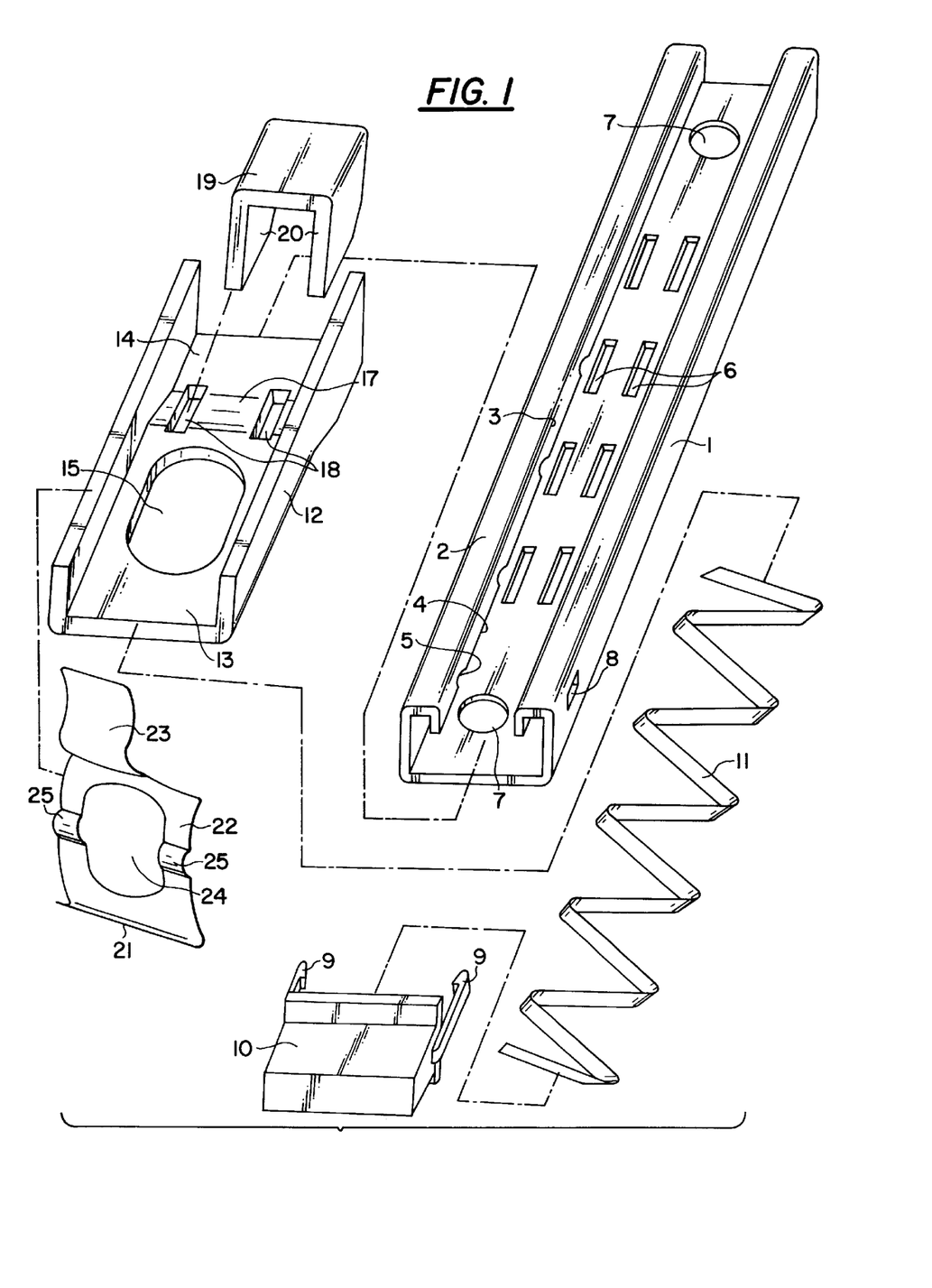
FIG. 1 represents a perspective view of individual elements of a height-adjustment device in accordance with the invention prior to their assembly.
Figure 2:
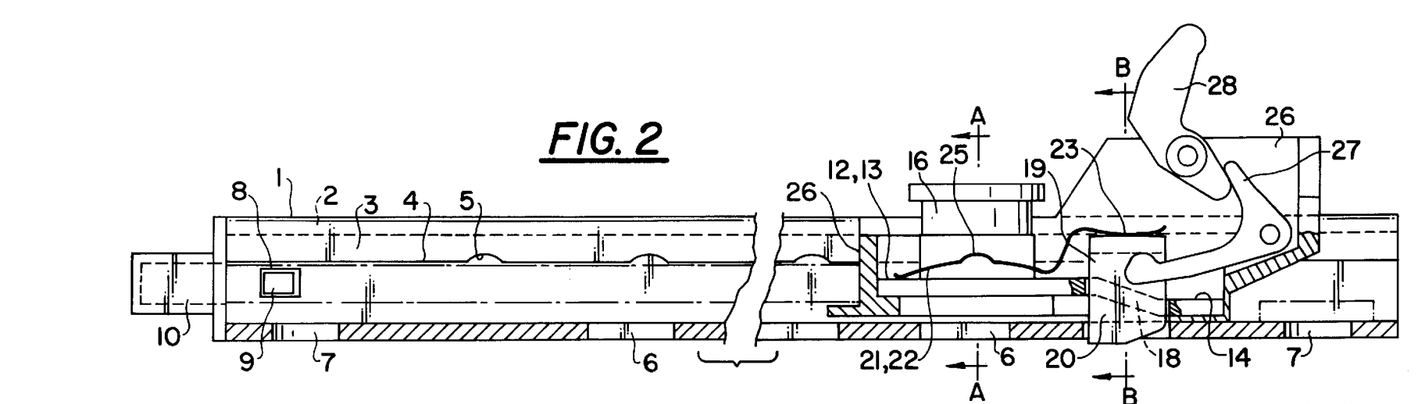
FIG. 2 shows an assembled height-adjustment device in a lateral view, partially in section.
Figure 3:
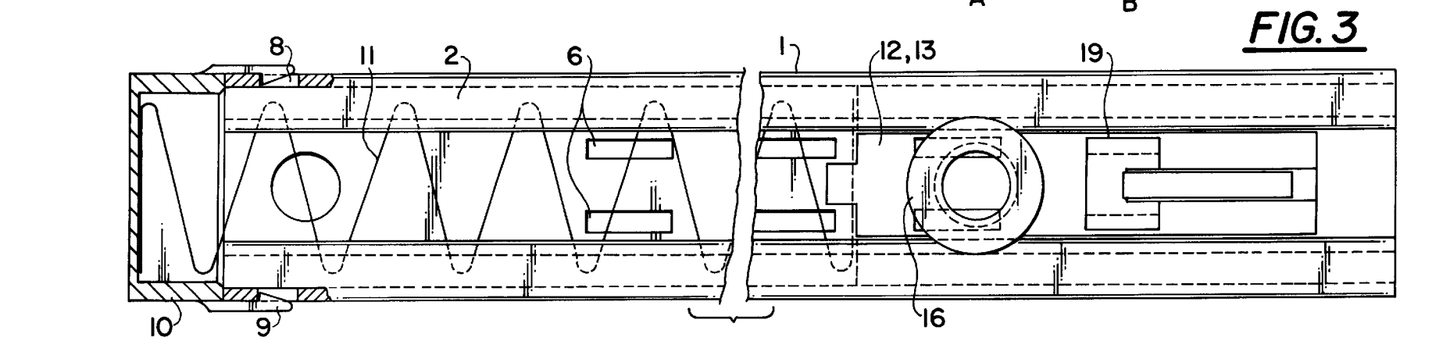
FIG. 3 shows the subject of FIG. 2 in a top view, partially in section.
Figure 4:
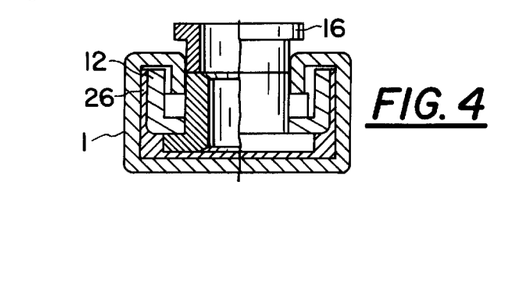
FIG. 4 shows the subject of FIG. 2 in section along the line A—A.
Figure 5:
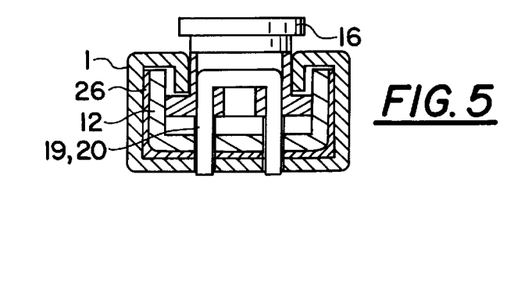
FIG. 5 shows the subject of FIG. 2 in section along the line B—B.

According to FIG. 1, a guide rail 1 has a C-shaped cross section, wherein the inward facing legs 2 include flanges 3, angled toward the interior. As a whole, the latter constitute reinforcement and guide strips. On the inner edge 4 of each flange 3, there are cutouts 5 spaced therealong. As represented, the guide rail 1 can extend in a straight line. However, as a modification, it can also be matched to its support surface, i.e. such as a pillar of a vehicle and in particular, can be concavely arched. Furthermore, recesses 6, arranged in pairs, appear in the center area of the base wall of the guide rail 1. Bores 7 at the lower and upper ends are used for attaching to a support surface.

Finally, cutouts 8 can be seen on the side of the lower end of the guide rail 1 which, together with flexible claws 9 of a closure cap 10 made of plastic, constitute a clip mechanism for securing the closure cap 10 on the guide rail 1. In this case, the closure cap 10 receives the end of a zig-zag-shaped compression spring 11, which is guided inside the guide rail 1 and in particular, along the flanges 3, and which constitutes an energy storage device. On the other side, the compression spring 11 is supported on an adjustment element 12, which initially is shown in FIG. 1 and the function of which will be explained in the subsequent figures.

Viewed in the operating direction, the adjustment element 12 has a lower plane or wall 13, which extends parallel in respect to an upper plane wall 14 and has an elongated cutout 15 for receiving a threaded bushing 16 (see FIGS. 2 to 5). The walls 13 and 14 are connected with each other via an inclined wall 17, which has a pair of recesses or openings 18 similar to the recesses 6 of the guide rail 1. In both cases, the recesses 6 and 18 have elongated rectangular shapes. These can be penetrated by a detent element 19, which is carried along by the adjustment element 12 and has detent projections, such as are constituted by its free legs 20. In this case, the upper end is slightly slanted (see FIG. 2) in the interest of easy release. The detent element 19 as a whole has a U-shaped cross section similar to the adjustment element 12 with its angled boundary walls.

Finally, a specially shaped metal leaf spring 21 is provided, which has a slightly upwardly arched base portion 22, which is followed by a vane-shaped extension 23 offset in height relative to portion 22. The base surface 22 has a cutout 24 for a threaded bushing 16 analogously to the adjustment element 12, and furthermore, two bead shaped protrusions 25. The importance of the above mentioned features will be explained in connection with the subsequent figures.

In accordance with FIGS. 2 to 5, the adjustment element 12 together with the threaded bushing 16, the detent element 19 and the leaf spring 21 have been inserted into a cage or carriage 26 made of plastic. The shown arresting position is achieved in that the recesses 6 of the guide rail 1 are aligned with the recesses 18 of the adjustment element 12, and the free legs 20 of the detent element 19 penetrate through these recesses 6 and 18. In a detent position, the detent element 19 is elastically held by means of the leaf spring 21, and in particular, its extension 23. With its protrusions 25, the base surface 22 can come into engagement with the cutouts 5 of the guide rail 1, which is used for locking. By means of this, the leaf spring 21 in accordance with the invention provides a dual function in comparison with known arresting mechanisms.

In order to be able to move the adjustment element 12 inside the guide rail 1, it is first necessary to lift the detent element 19, for which a tilting lever 27 and reversing lever 28 are used. To this end, the tilting lever 27 acts on the detent element 19 on the side facing away from the leaf spring 21. With the detent element 19 released, i.e. lifted, the compression spring 11, which is clamped between the adjustment element 12 and the closure cap 10, becomes effective as a restoring member, i.e. it tries to push the adjustment element 12 back into its initial position to the right as viewed in FIGS. 2 and 3. Conversely, with a downward movement of the element 19, the compression spring 11 develops an elastic resistance, so that it is necessary to pull the direction reversing guide down for displacement into a lower arresting position.

Figure 6:
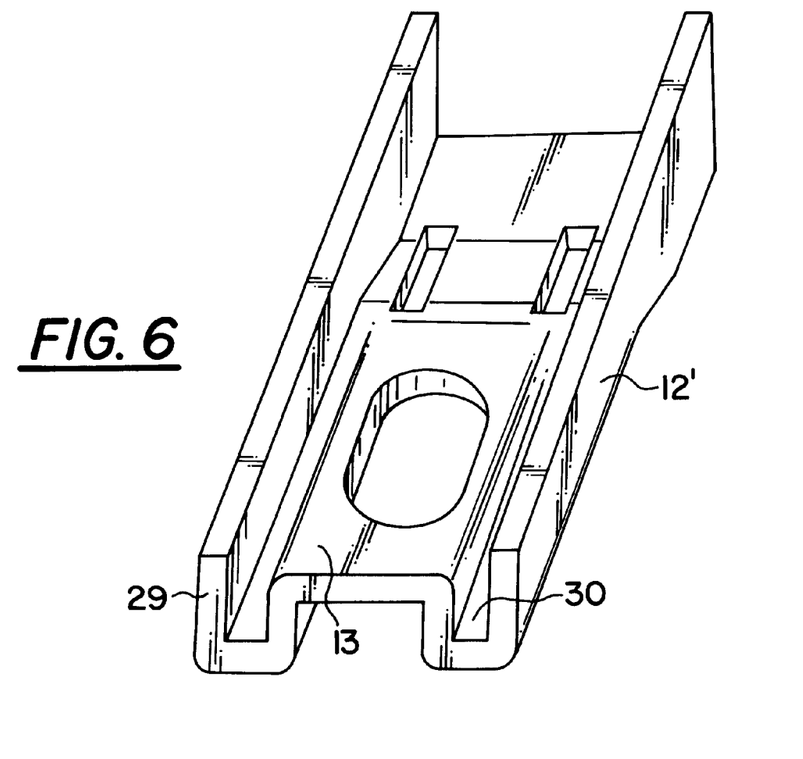
FIG. 6 represents a perspective view of an adjustment element slightly different from the previous drawing figures.

In a modified form, adjustment element 12' is shown in FIG. 6 where reinforcement and guide grooves 30 are provided between its boundary walls 29 and its protruding lower wall 13. This results in additional guidance with the flanges 3 of the guide rail 1. This arrangement at the same time provides an increase in safety in case of a crash, because the guide rail 1 and the adjustment element 12' become jammed in such a way that bending open the guide rail 1 and pulling the adjustment element 12' out of the guide rail becomes virtually impossible. This increase in sturdiness, which can be achieved by special shaping, can on the other hand be used to further reduce the thickness of the material.

Figure 7:
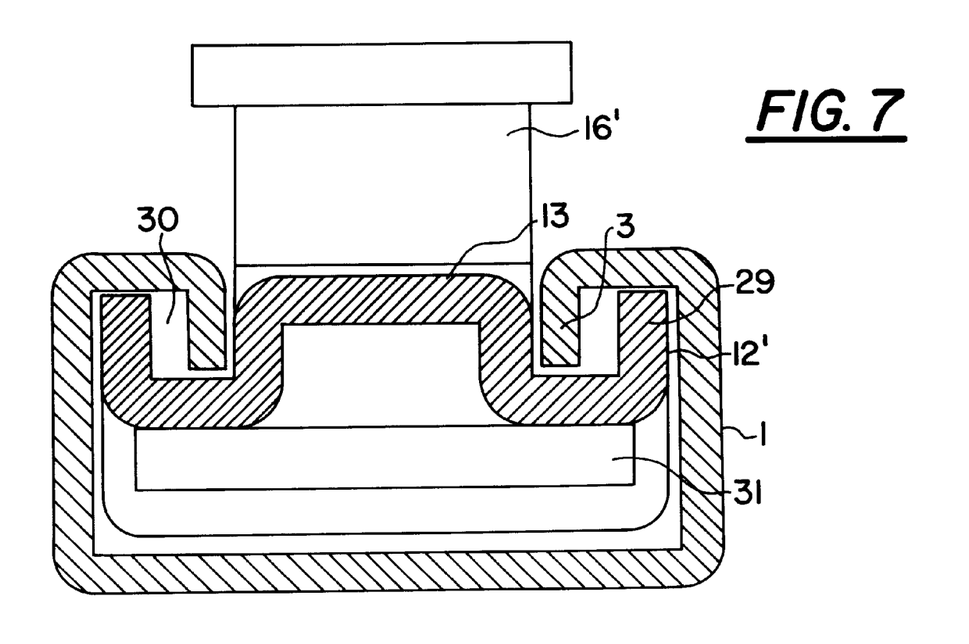
FIG. 7 represents a cross section of the subject of FIG. 6 inserted into a guide rail.

In accordance with FIG. 7, an adjustment element 12' is provided with a threaded bushing 16' and has been inserted into a guide rail 1. In contrast to the threaded bushing 16 of the previous drawing figures, the threaded bushing 16' in FIG. 7 has a slightly widened lower part 31. Its diameter has been selected to be of such a size that in the case of a frictional connection, the effect of the force takes place directly on the two boundary walls 29 of the adjustment element 12', so that in this way, a direct forced support in the guide rail 1 is provided. As a result, in case of a crash, wedging between the guide rail 1 and the adjustment element 12' takes place, and the tearing out of the adjustment element 12' is prevented. In the same way, pulling out the lower part or collar 31 of the threaded bushing 16' between the boundary walls 29 of the adjustment element 12' is also not possible.

Figure 8:
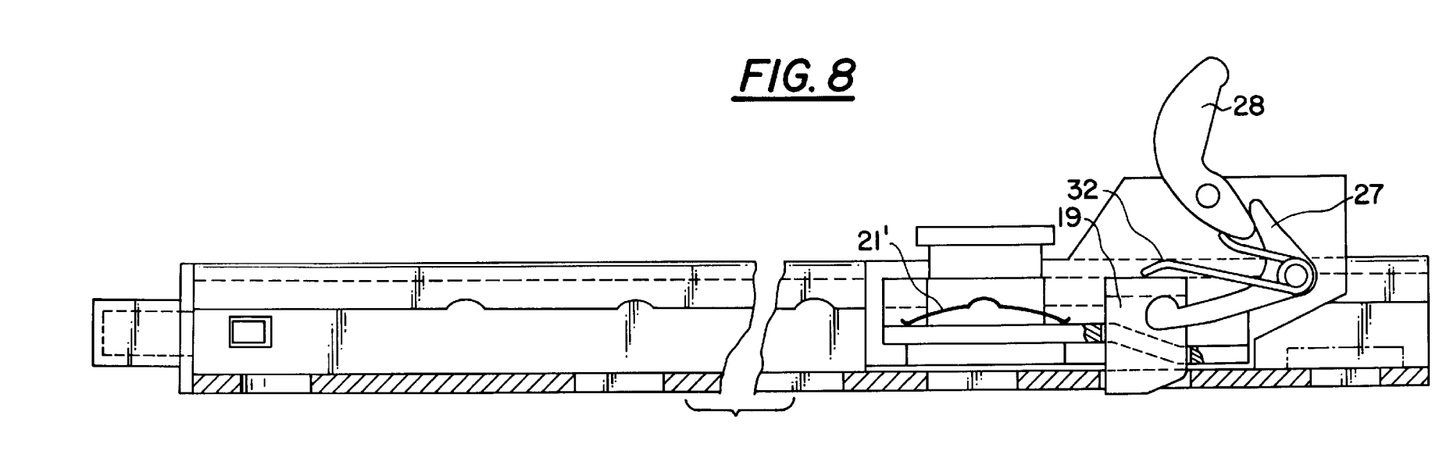
FIG. 8 is a lateral view, partially in section, of another height-adjustment device with a special spring combination for advancing and arresting.

FIG. 8 shows another height-adjustment device, namely with a special spring combination for advancing and arresting the position of the adjusting device. While a leaf spring 21' (without an extension) takes care of the prelocking, a leg spring 32 is used for arresting. To this end, it has been placed on the shaft of the tilting lever 27 and keeps the detent element 19 under a compressive strain with one leg, while it is supported by the other leg end on the lower lever arm of the reversing lever 28. This embodiment can be considered to be particularly quick to respond.

Figure 9:
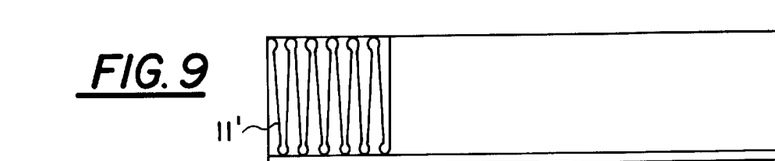
FIG. 9 is a lateral view of a compression spring, slightly different from the previous drawing figures, in a compressed state.
Figure 10:
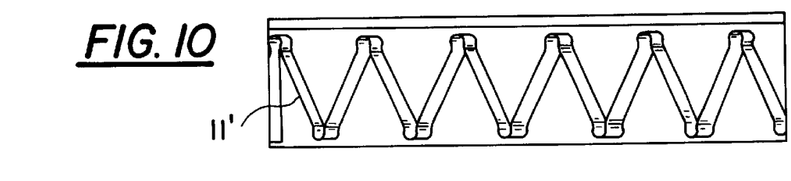
FIG. 10 is a perspective view of the subject of claim 9, expanded.
Figure 11:
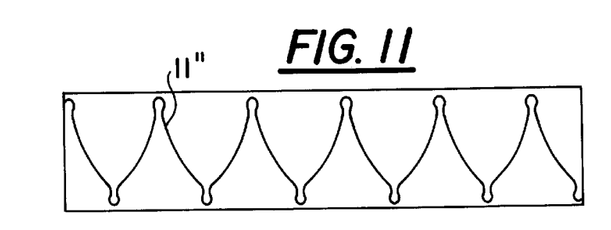
FIG. 11 is a lateral view of further embodiment of an expanded compression spring.
Figure 12:
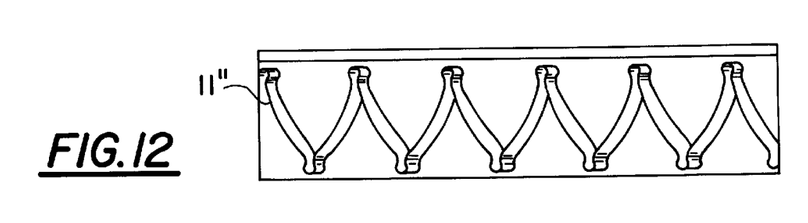
FIG. 12 represents the subject of FIG. 11 in a perspective view.
Figure 13:
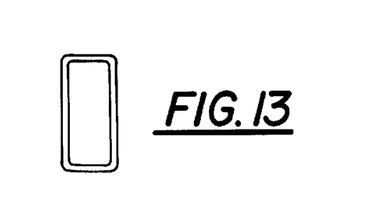
FIG. 13 is a front view of another embodiment of a compression spring, namely in a rectangular shape.
Figure 14:
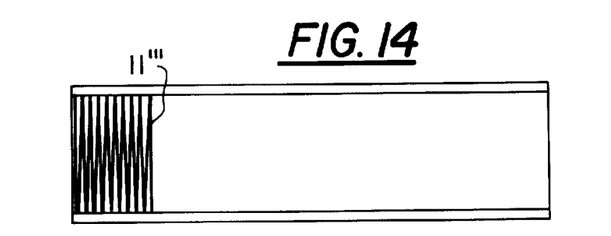
FIG. 14 is a lateral view of the subject of FIG. 13 in a compressed state.
Figure 15:
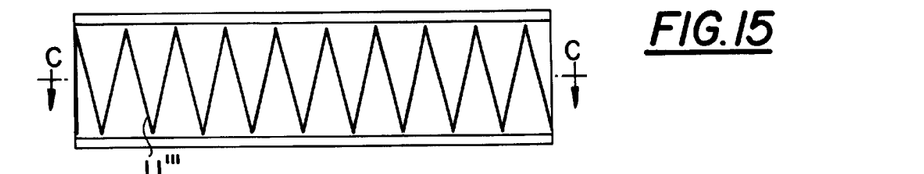
FIG. 15 represents the subject of FIG. 14 in an expanded state.
Figure 16:
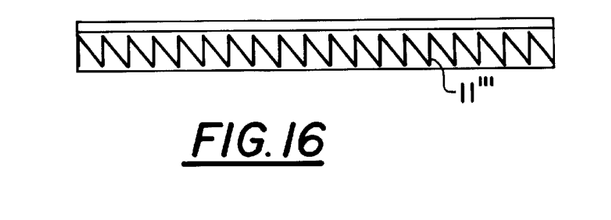
FIG. 16 shows the subject of FIG. 15 in section along the line C—C.

FIGS. 9 to 16 make it clear that compression springs of quite different designs can be employed, in particular, also those with specially shaped reversing areas and curved sections between their reversing areas, such as identified by the reference numeral 11' in FIGS. 9 and 10, or respectively by the reference numeral 11" in FIGS. 11 and 12. Finally, rectangular compression springs 11''', such as represented in FIGS. 13 to 16, are also particularly suitable.

From the foregoing, it can be said that the described height-adjustment device in accordance with the invention is well arranged, simple to assemble and easy to use, and is distinguished by great reliability, along with low weight and low production costs.

What is claimed is:

1. A vehicle safety belt position adjustment device, comprising:

a guide rail, which is attachable to a vehicle, the guide rail having a generally C-shaped cross-section and including two legs, each leg including a portion extending toward a portion of the other leg, each leg also including a terminal portion extending toward an interior portion of the guide rail, the guide rail further including a plurality of recesses arranged along a central area of the guide rail;

an adjustment carriage, which is displaceable in the guide rail, guided by the guide rail legs and constructed and arranged for connection to a belt mounting member, including at least one locking aperture positioned in a central portion of the adjustment carriage so as to align with the plurality of guide rail recesses;

a locking device constructed and arranged to be disposed in the adjustment carriage aperture and to selectively engage the guide rail recesses to lock the adjustment carriage in a plurality of locking positions with respect to the guide rail;

a locking spring for engaging the locking device and biasing the locking device into the guide rail recesses, the spring also constructed and arranged to engage the guide rail and selectively position the adjustment carriage in the plurality of locking positions;

an adjustment carriage spring constructed and arranged to bias the adjustment carriage between a first end position and a second end position within the guide rail; and a disengagement lever constructed and arranged to selectively disengage the locking device from the guide rail recesses to allow movement of the adjustment carriage in the guide rail.

2. A device as in claim 1, wherein the locking device comprises a latch having a generally U-shaped cross-section with two free legs for engaging the guide rail recesses.

3. A device as in claim 1, wherein the central portion of the adjustment carriage includes an upper planar portion connected to a lower planar portion by an inclined portion, with the locking aperture disposed in the inclined portion.

4. A device as in claim 3, and further including a plastic guide carriage attached to the adjustment carriage for carrying the adjustment carriage in the guide rail.

5. A device as in claim 4, wherein the locking spring is a leaf spring having portions which extend under the two guide rail leg terminal portions, at least one of the spring extending portions having a protrusion for selectively engaging any of a plurality of recesses in at least one of the guide rail terminal portions to position the adjustment carriage at a desired one of the locking positions.

6. A device as in claim 5, wherein the at least one protrusion has a semi-circular form.

7. A device as in claim 6, wherein the adjustment carriage spring is disposed between the adjustment carriage and a first end of the guide rail.

8. A device as in claim 7, and further including a closure cap for engaging and at least partially closing the first end of the guide rail and for providing a mount for a first end of the adjustment carriage spring.

9. A device as in claim 8, and further including a clip mechanism for clamping the closure cap to the guide rail.

10. A device as in claim 9, wherein the adjustment carriage includes a pair of extending leg portions connected by the central portion and at least one reinforcement groove disposed between the central portion and one of the extending leg portions.

11. A device as in claim 10, wherein the guide rail is shaped to have a contour generally matching a contour of a portion of the vehicle to which it is attachable.

12. A device as in claim 1, wherein the locking spring is a leaf spring having portions which extend under the two guide rail leg terminal portions, at least one of the spring extending portions having a protrusion for selectively engaging any of a plurality of recesses in at least one of the guide rail terminal portions to position the adjustment carriage at a desired one of the locking positions.

* * * * *

UNITED STATES PATENT AND TRADEMARK OFFICE
CERTIFICATE OF CORRECTION

PATENT NO. : 4,908,205

DATED : March 13, 1990

INVENTOR(S) : Bennett et al.

It is certified that error appears in the above-identified patent and that said Letters Patent is hereby corrected as shown below:

On title page, in the section [*] Notice, please replace "Oct. 11, 2005", with -- Dec. 17, 2005--.

Signed and Sealed this

Twelfth Day of December, 2000

Attest:

Q. TODD DICKINSON

*Attesting Officer*      *Director of Patents and Trademarks*

UNITED STATES PATENT AND TRADEMARK OFFICE
CERTIFICATE OF CORRECTION

PATENT NO. : 5,908,205
DATED : June 1, 1999
INVENTOR(S) : Albert Griesemer

It is certified that error appears in the above-identified patent and that said Letters Patent is hereby corrected as shown below:

Add as inventor: -- Else Kreim, Georgenstrasse 8, Buttelborn, D-64572 Germany --

Signed and Sealed this

Eighteenth Day of September, 2001

Attest:

Nicholas P. Godici

NICHOLAS P. GODICI
*Attesting Officer*    *Acting Director of the United States Patent and Trademark Office*